United States Patent [19]
Goto

[11] Patent Number: 6,155,393
[45] Date of Patent: Dec. 5, 2000

[54] AUTOMOTIVE PEDAL SUPPORT MEMBER STRUCTURE

[75] Inventor: Hiroyuki Goto, Hamamatsu, Japan

[73] Assignee: Suzuki Motor Corporation, Shizuoka-ken, Japan

[21] Appl. No.: 09/382,094

[22] Filed: Aug. 24, 1999

[30] Foreign Application Priority Data

Aug. 24, 1998 [JP] Japan .................................. 10-237087

[51] Int. Cl.[7] ........................... B60K 41/24; F16D 67/02; G05G 1/14; B62D 1/11
[52] U.S. Cl. ........................... 192/13 R; 74/512; 280/777
[58] Field of Search ................... 74/512, 513; 192/13 R, 192/13 A; 280/779

[56] References Cited

U.S. PATENT DOCUMENTS 5,044,223  9/1991  Mizuma et al. ........................ 74/512
5,259,646  11/1993  Snyder ..................................... 280/777

Primary Examiner—Charles A Marmor
Assistant Examiner—Tisha D. Waddell
Attorney, Agent, or Firm—Alston & Bird LLP

[57] ABSTRACT

In an automotive pedal support member structure, in which a clutch pedal 1 and a brake pedal 2 are provided in parallel on a support member 4, and a turn-over mechanism for the clutch pedal 1 is disposed at a position closer to the vehicle center from the brake pedal 2, a protective member 33 is provided on the support member 4 to prevent the interference of a wiring harness 34 laid in the vehicle width direction above the support member 4 with the turn-over mechanism. Thereby, there is provided an automotive pedal support member structure capable of preventing any possibility of interference of a wiring harness with a clutch pedal lever.

6 Claims, 7 Drawing Sheets

AUTOMOTIVE PEDAL SUPPORT MEMBER STRUCTURE

FIELD OF THE INVENTION AND RELATED ART STATEMENT

The present invention relates to an automotive pedal support member structure in which the interference of a wiring harness laid in a cabin with a turn-over mechanism of a clutch pedal is prevented.

Generally, a brake booster and a clutch master cylinder are disposed corresponding to a brake pedal and a clutch pedal.

On the other hand, on a left hand drive car, the brake booster and the clutch master cylinder are sometimes arranged so as to be reverse to the arrangement of the brake pedal and the clutch pedal for the reason of the engine room layout.

Also, the clutch pedal uses a turn-over mechanism to reduce a clutch operating force. The turn-over mechanism is a mechanism in which when the clutch pedal is depressed, in order to reduce a depressing force at the latter half time of depression when the clutch pedal feels heavy, a turn-over spring is fixed so as to assist the depressing force by means of its urging force at the latter half time of depression.

FIG. 9 shows a structure around a pedal of this conventional type.

Flange portions of a U-shaped pedal bracket 100 are fitted with a first boss 101 and a second boss 102. In the first boss 101 and the second boss 102 is inserted a pedal shaft 103, and a clutch pedal 104 is mounted on the pedal shaft 103. Between the first boss 101 and the second boss 102, a brake pedal 105 is disposed, and this brake pedal 105 is pivotally mounted on the pedal shaft 103. On the pedal shaft 103 on the outside of the second boss 102 is mounted a clutch pedal lever 106, and a clutch master cylinder (not shown) is operated by the turning of this clutch pedal lever 106.

FIG. 10 shows an example of wiring installed on the back side of an instrument panel 107.

A floor wiring harness laid near both side sills in the longitudinal direction of a vehicle is connected to a main wiring harness 109 via a coupler 108. This wiring harness 109 consists of a bundle in which a wiring harness 111 from a coupler 110 connected to a remote controlled mirror, a wiring harness 113 from a front speaker 112, and the like, which are led from one side in the vehicle width direction, and a wiring harness 115 from a coupler 114 connected to a combination switch etc., a wiring harness 116 from a speedometer, a wiring harness 117 from various types of switches etc., and the like, which are led from the other side, are bundled.

This wiring harness 109 is bundled into one in the vehicle width direction, and then is laid in an engine room.

Thus, as shown in FIG. 9, the wiring harness 109 is laid in the vehicle width direction above the pedal bracket 100 by being supported on a dash panel 118. This wiring harness 109 is bundled into one and is laid along the dash panel 118.

Conventionally, therefore, the wiring harness 109 laid above the pedal bracket 100 hangs down and may interfere with the clutch pedal lever 106 at point A when the clutch is operated. In particular, because length B of the boss 102 is increased to provide the turn-over mechanism, the wiring harness 109 easily interferes with the clutch pedal lever 106.

OBJECT AND SUMMARY OF THE INVENTION

The present invention has been made to solve the above problem, and accordingly an object thereof is to provide an automotive pedal support member structure capable of preventing any possibility of interference of a wiring harness with a clutch pedal lever.

To achieve the above object, the present invention provides an automotive pedal support member structure, in which a clutch pedal and a brake pedal are provided in parallel on a support member, and a turn-over mechanism for the clutch pedal is disposed at a position closer to the vehicle center from the brake pedal, characterized in that a protective member is provided on the support member to prevent the interference of a wiring harness laid in the vehicle width direction above the support member with the turn-over mechanism.

Also, the present invention provides an automotive pedal support member structure, in which a clutch pedal and a brake pedal are provided in parallel on a support member, and a turn-over mechanism for the clutch pedal is disposed at a position closer to the vehicle center from the brake pedal, characterized in that a protective member which connects a stay for fixing one end of a spring for the turn-over mechanism to a boss for supporting a pedal shaft is provided on the support member.

Further, since a protective member for preventing the interference of a wiring harness with the turn-over mechanism is provided on the support member for supporting the clutch pedal and the brake pedal, the interference of the wiring harness with the turn-over mechanism can be prevented when the clutch is operated.

DETAILED DESCRIPTION OF PREFERRED EMBODIMENTS

An embodiment of the present invention which is applied to a left hand drive car will now be described with reference to the accompanying drawings.

Figure 1:
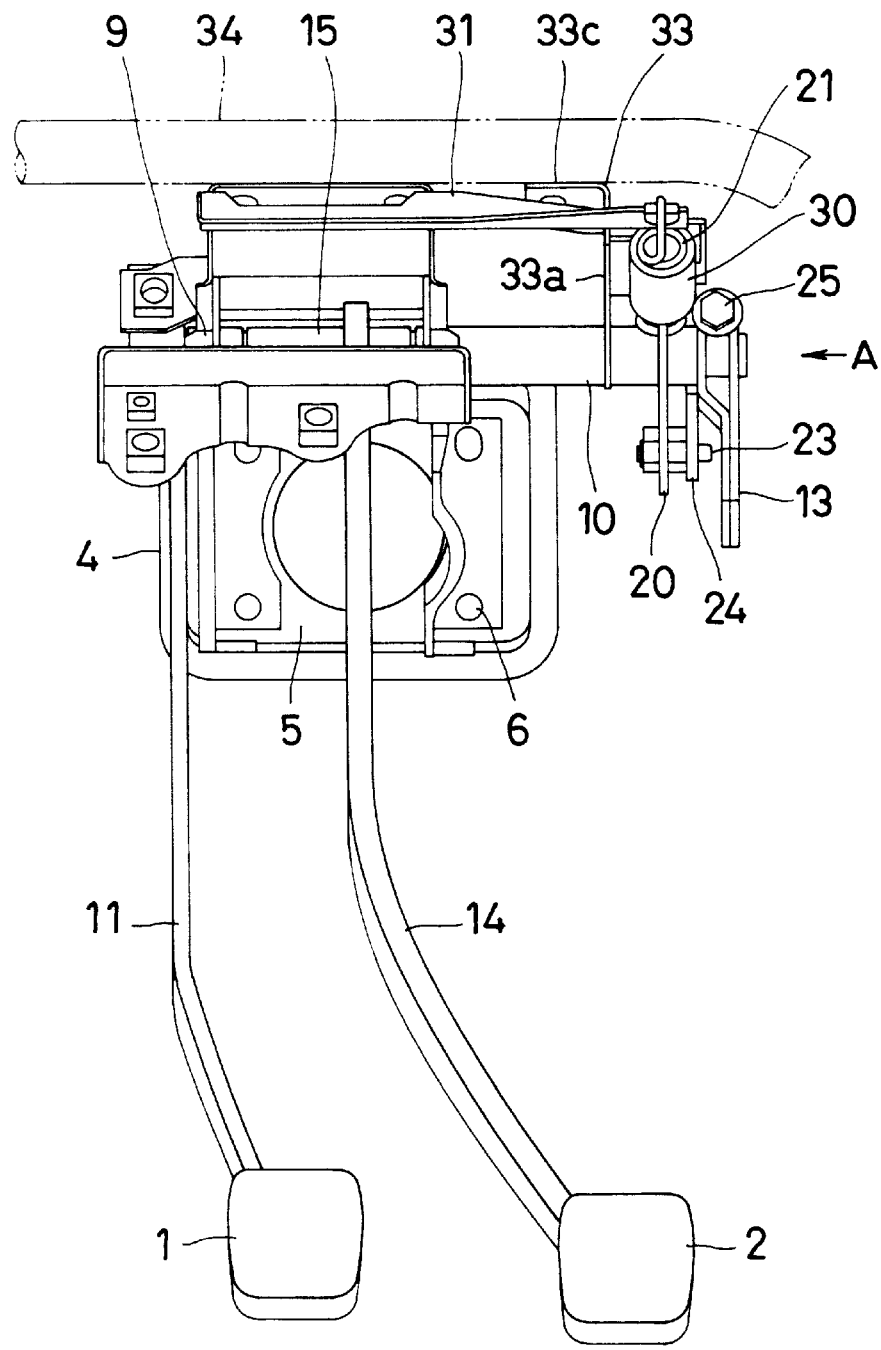
FIG. 1 is a front view showing an automotive pedal support member structure in accordance with an embodiment of the present invention.
Figure 2:
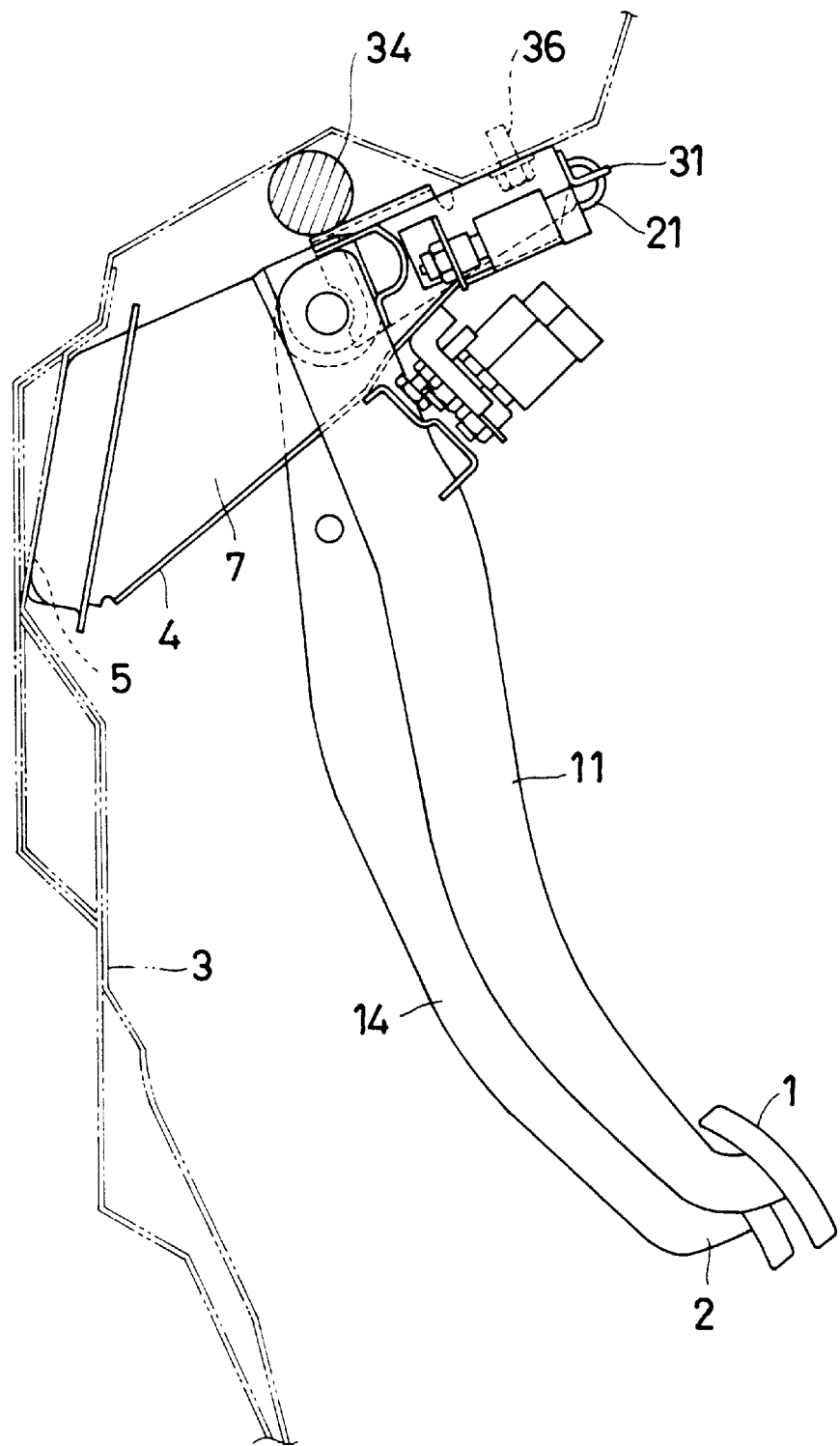
FIG. 2 is a left side view of FIG. 1.
Figure 3:
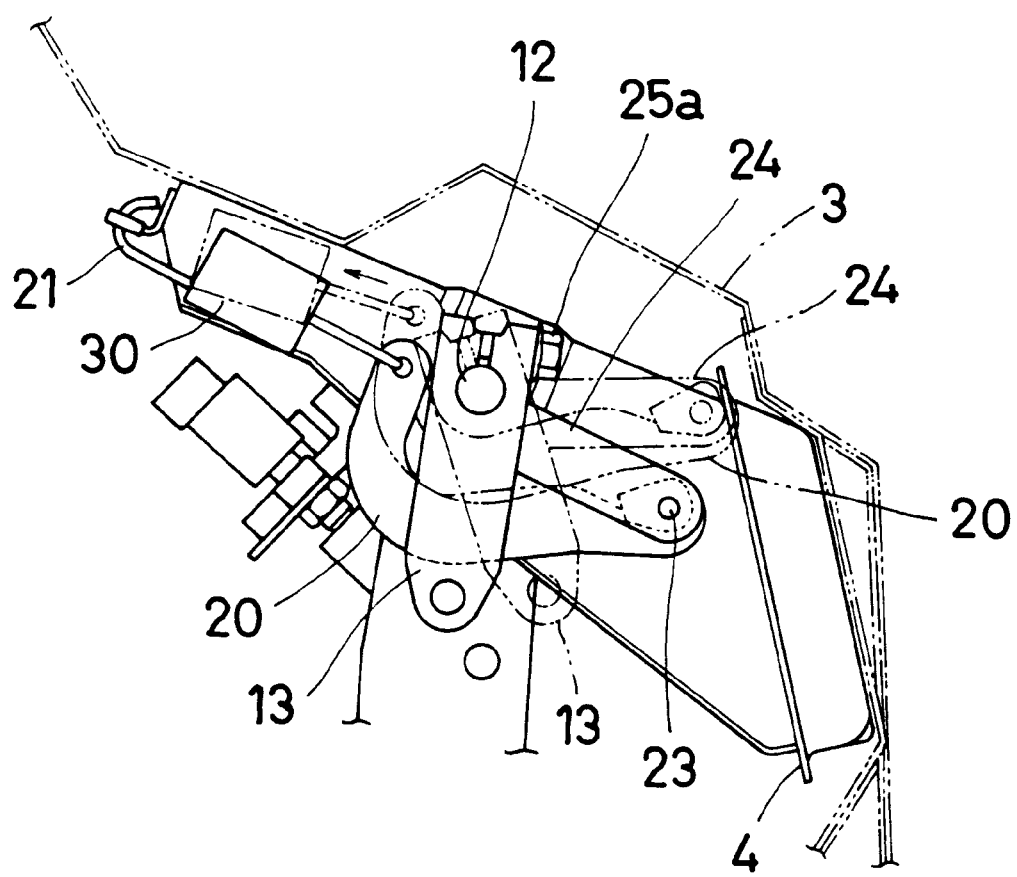
FIG. 3 is a view taken in the direction of the arrow A of FIG. 1.
Figure 4:
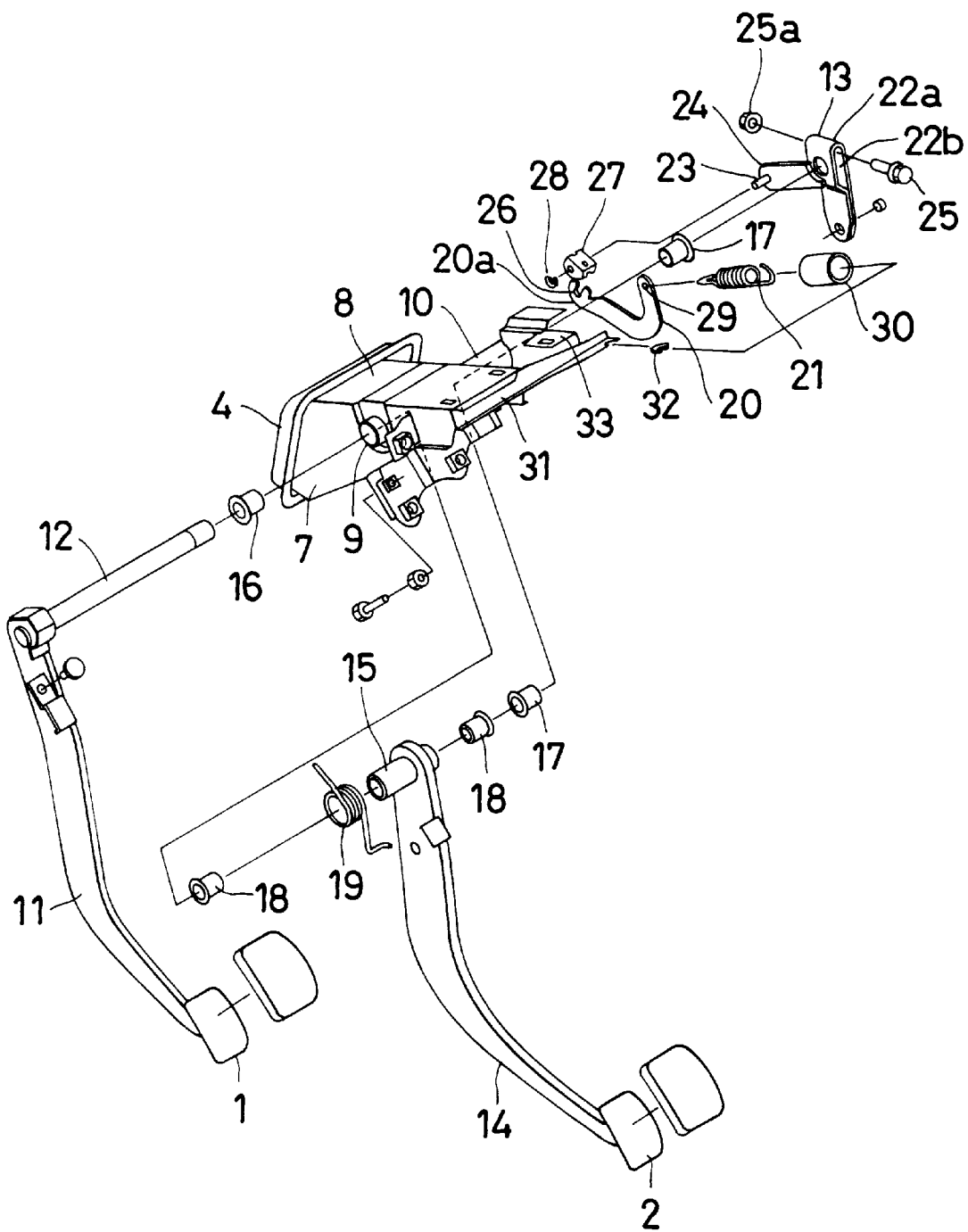
FIG. 4 is an exploded perspective view showing the automotive pedal support member structure shown in FIG. 1.
Figure 5:
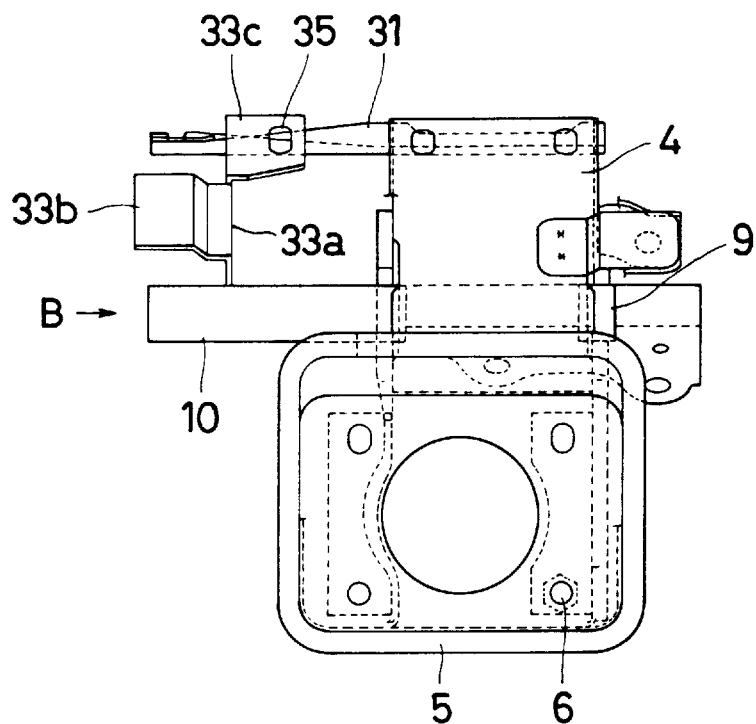
FIG. 5 is a front view showing a pedal bracket portion.
Figure 6:
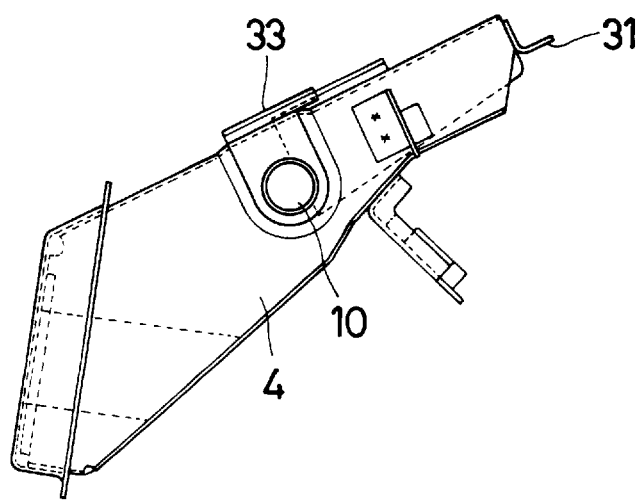
FIG. 6 is a side view of FIG. 5.
Figure 7:
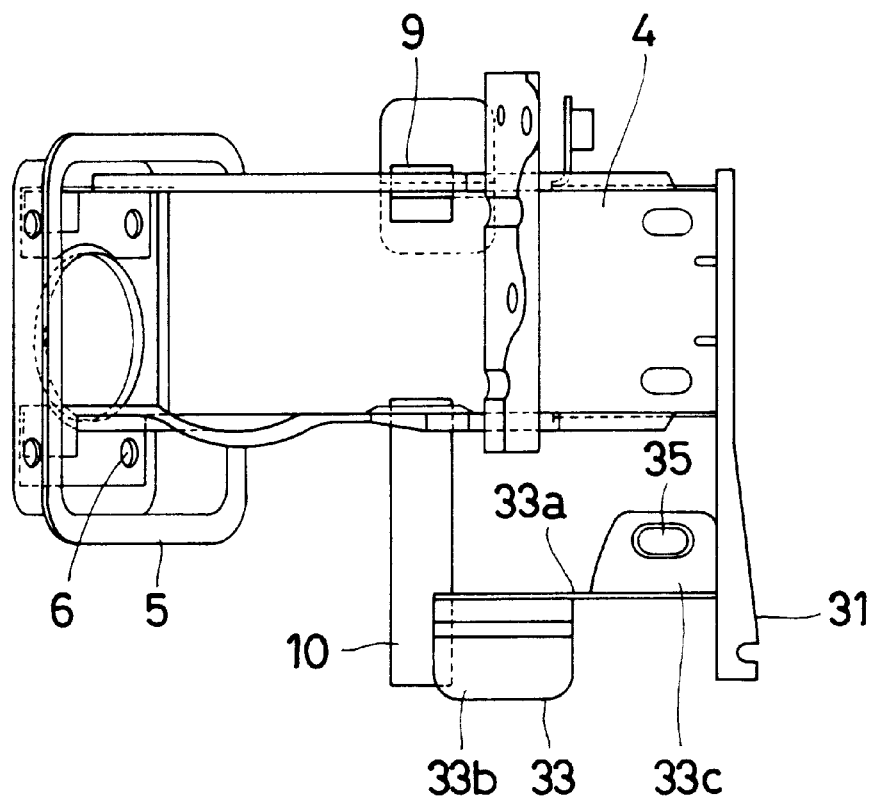
FIG. 7 is a bottom view of FIG. 5.
Figure 8:
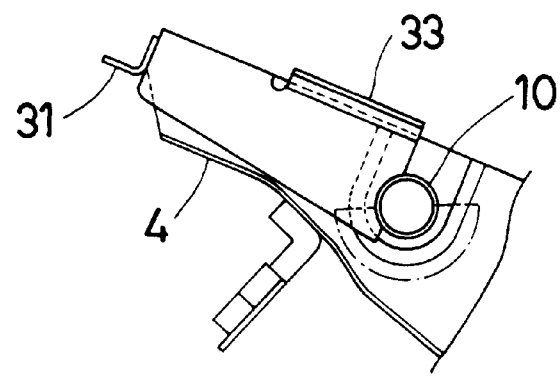
FIG. 8 is a view taken in the direction of the arrow B of FIG. 5.
Figure 9:
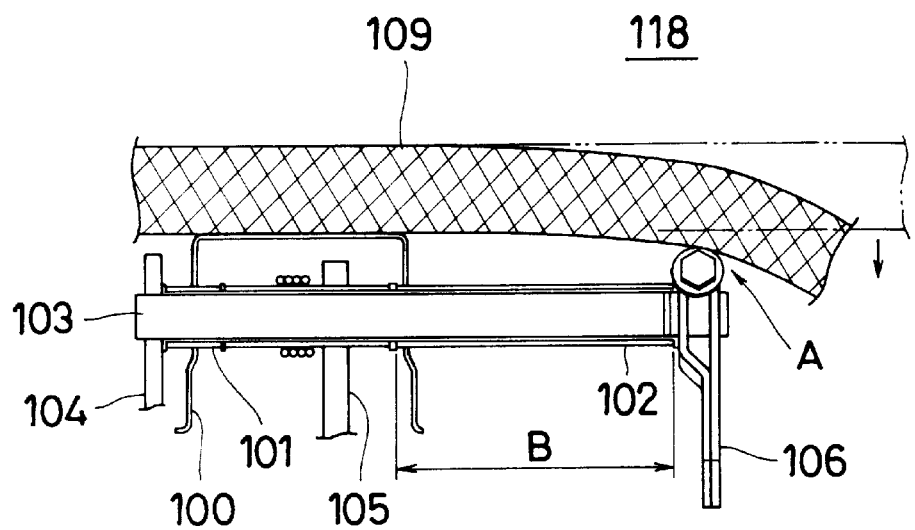
FIG. 9 is a schematic sectional view showing a conventional pedal bracket portion.
Figure 10:
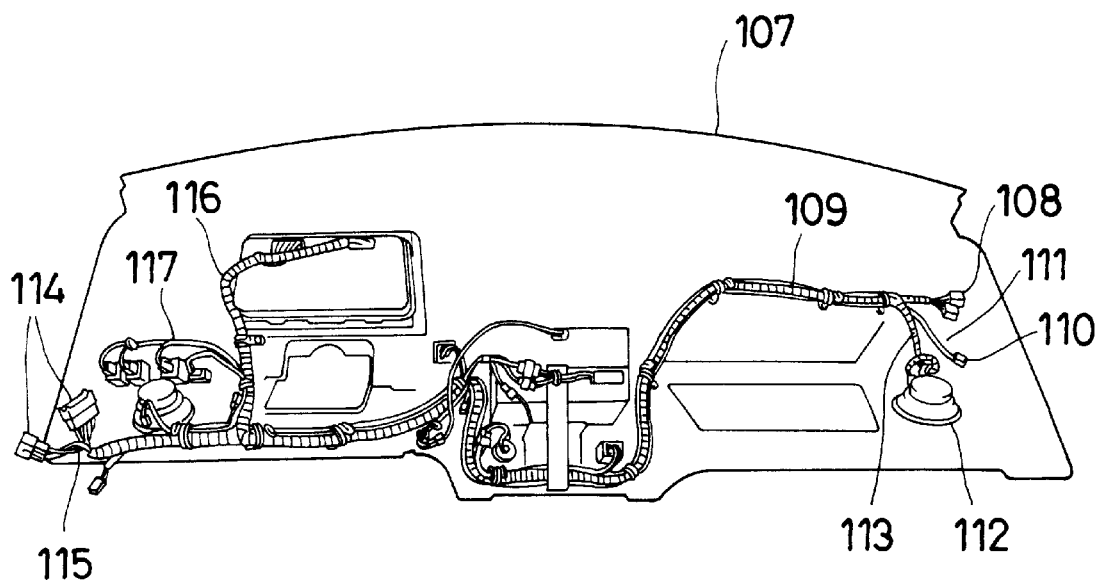
FIG. 10 is a schematic view showing a wiring harness installed on the back side of an instrument panel.

FIG. 1 is a front view showing an automotive pedal support member structure equipped with a turn-over mechanism, FIG. 2 is a left side view of FIG. 1, FIG. 3 is a right side view of FIG. 1, and FIG. 4 is an exploded perspective view.

Referring to FIGS. 1 to 4, a clutch pedal 1 and a brake pedal 2 are mounted on the left side in the vehicle width direction of a dash panel 3 via a pedal bracket 4. The pedal bracket 4 functions as a support member for supporting the clutch pedal 1 and the brake pedal 2. A front face portion 5 of the pedal bracket 4 is screwed on the dash panel 3 via bolts 6. A pair of side walls 7 extending to the rear so as to be opposed to each other are provided at both sides of the front face portion 5, and a ceiling face 8 is provided between the side walls 7.

These side walls 7 each are formed with a hole at the corresponding positions. In the hole in the left side wall 7 is mounted a short boss 9, and in the hole in the right side wall 7 is mounted a long boss 10 in the vehicle width direction.

The clutch pedal 1 is mounted with a pedal shaft 12 extending toward the vehicle center direction at the base end of a pedal arm 11.

This pedal shaft 12 is inserted in the bosses 9 and 10, and is supported on the pedal bracket 4. At the tip end of the pedal shaft 12 is mounted a clutch pedal lever 13 for operating a clutch master cylinder.

The brake pedal 2 is mounted with a cylinder 15 in the vehicle width direction at the base end portion of a pedal arm 14. This cylinder 15 is disposed between the bosses 9 and 10, and is supported by the pedal shaft 12 of the clutch pedal 1. The boss 9 is mounted with a bush 16 on the outside, and the boss 10 is mounted with bushes 17 on both sides. Also, the cylinder 15 is mounted with bushes 18 on both sides.

Reference numeral 19 denotes a return spring mounted to the brake pedal 2.

A turn-over mechanism is, as shown in FIG. 4, made up of the clutch pedal lever 13, a return spring arm 20 of a dog-legged shape or an L shape, a return spring 21, and the like.

The clutch pedal lever 13, consisting of a long plate 22 folded in two, is provided with a clearance portion 22b at a folded portion 22a, and is provided with an arm 24, from which a pin 23 is protruded, at a predetermined angle with respect to the axial direction of the plate 22 at the side of the plate 22. This clutch pedal lever 13 is assembled to the boss 10 via the bush 17, and is fixed to the boss 10 via a clutch pedal lever bolt 25 and a nut 25a, which are mounted in the clearance portion 22b and threadedly engaged with each other.

At an engagement portion 26 provided at a base end portion 20a of the return spring arm 20 is mounted a bush 27. The pin 23 provided on the arm 24 of the clutch pedal lever 13 is inserted in a hole in this bush 27, and an E ring is fixed to the tip end of the pin 23 to prevent the coming-off.

The tip end portion of the return spring arm 20 is formed with a mounting hole 29, and one end of the return spring 21, which is covered with a spring tube 30, is fixed to the mounting hole 29. The other end portion of the return spring 21 is hooked to the tip end of a spring fixing stay 31 mounted at the rear end of the pedal bracket 4 via a bush 32. The stay 31 extends by a predetermined length along the boss 10, and a bracket 33 serving as a protective member is installed between the stay 31 and the boss 10.

As shown in FIGS. 5 to 8, the bracket 33 is made up of a connecting portion 33a which is connected between the stay 31 and the boss 10 to reinforce the pedal bracket 4, a harness pressing portion 33b which is bent in the opposite direction along the boss 10 and the stay 31 from an intermediate position of the connecting portion 33a, and a tightening portion 33c. The harness pressing portion 33b is extended to the tip end portion of the boss 10, and supports a wiring harness 34 hanging down on the side of the pedal bracket 4, by which the interference of the wiring harness 34 with the clutch pedal lever 13 is prevented.

The tightening portion 33c is formed with a mounting hole 35. A screw 36 is caused to pass through the mounting hole 35, and is threadedly engaged with the side of the dash panel 3, by which the tightening portion 33c is fixed to the dash panel 3 (see FIG. 2).

According to the above-described construction, when the clutch pedal 1 is depressed, the pedal shaft 12 turns via the pedal arm 11. Then, the clutch pedal lever 13 is turned, by which the clutch master cylinder is operated.

If the wiring harness 34 laid in the vehicle width direction on the dash panel 3 hangs down to the side of the pedal bracket 4, the wiring harness 34 is supported by the harness pressing portion 33b of the bracket 33, so that there is no possibility of interfering with the clutch pedal lever 13. Therefore, improper release of clutch and damage to the wiring harness 34 can be prevented.

Also, since the pedal bracket 4 between the boss 10 and the stay 31 is connected by the bracket 33, the rigidity of the pedal bracket 4 can be increased.

Further, since the tightening portion 33c is fixed to the dash panel 3, the rigidity of the mounting portion of the pedal bracket 4 is increased.

Needless to say, the present invention is not limited to the above-described embodiment, and changes can be made appropriately within a scope in which the teachings of the present invention are not changed.

For example, the shape and size of the harness pressing portion 33b of the bracket 33 can be set arbitrarily. Also, the installation position of the bracket 33 can be changed appropriately by changing the distance between the boss 10 and the stay 31 and the length thereof.

As described above, according to the automotive pedal support member structure in accordance with the present invention, the following effects can be achieved.

In an automotive pedal support member structure, in which a clutch pedal and a brake pedal are provided in parallel on a support member, and a turn-over mechanism for the clutch pedal is disposed at a position closer to the vehicle center from the brake pedal, a protective member is provided on the support member to prevent the interference of a wiring harness laid in the vehicle width direction above the support member with the turn-over mechanism. Therefore, when the wiring harness laid in the vehicle width direction on a dash panel hangs down to the pedal bracket side, the wiring harness is supported by the protective member. Thereupon, there is no possibility of interference of the wiring harness with a clutch pedal lever, so that improper release of clutch and damage to the wiring harness can be prevented.

Also, in an automotive pedal support member structure, in which a clutch pedal and a brake pedal are provided in parallel on a support member, and a turn-over mechanism for the clutch pedal is disposed at a position closer to the vehicle center from the brake pedal, a protective member which connects a stay for fixing one end of a spring for the turn-over mechanism to a boss for supporting a pedal shaft is provided on the support member. Therefore, there is no possibility of interference of the wiring harness with a clutch pedal lever. Thereupon, improper release of clutch and damage to the wiring harness can be prevented.

Since the support member, stay, boss, and protective member form a square, the rigidity around the boss portion can be increased.

Since the support member is screwed to the dash panel, the rigidity around the pedal bracket can be increased.

Since the turn-over mechanism is disposed between the support member and the clutch pedal lever for operating a clutch master cylinder, the interference of the wiring harness with the turn-over mechanism can be prevented by the protective member.

What is claimed is:

1. An automotive pedal support member structure, in which a clutch pedal and a brake pedal are provided in parallel on a support member, and a turn-over mechanism for the clutch pedal is disposed at a position closer to the vehicle center from said brake pedal, wherein a protective member which connects a stay for fixing one end of a spring for the turn-over mechanism to a boss for supporting a pedal shaft is provided on said support member.

2. The automotive pedal support member structure according to claim 1, wherein said support member is screwed to a dash panel.

3. An automotive pedal support member structure for a clutch pedal and a brake pedal, said automotive pedal support member structure comprising:

a support member having a pair of opposed side walls extending rearward;

a boss connected to each side wall;

a pedal shaft supported by the boss, the pedal shaft having a distal end spaced from the support member in a vehicle width direction toward a vehicle center;

a stay affixed to the support member spaced from the boss and extending toward the vehicle center;

a clutch pedal lever of a turn-over mechanism for the clutch pedal mounted on the distal end of the pedal shaft for operating a clutch master cylinder;

a spring and a return spring arm of the turn-over mechanism disposed between the clutch pedal lever and the support member, the spring being connected between the stay and one end of the return spring arm; and a protective member connected between the stay and the boss for preventing interference between the turn-over mechanism and a wiring harness running above the support member in said vehicle width direction.

4. An automotive pedal support member structure, in which a clutch pedal and a brake pedal are provided in parallel on a support member, and a turn-over mechanism for the clutch pedal is disposed at a position closer to the vehicle center from said brake pedal, wherein a protective member which connects a stay for fixing one end of a spring for the turn-over mechanism to a boss for supporting a pedal shaft is provided on said support member, and said support member, stay, boss, and protective member form a square.

5. The automotive pedal support member structure according to claim 4, wherein said support member is screwed to a dash panel.

6. An automotive pedal support member structure for a clutch pedal and a brake pedal, said automotive pedal support member structure comprising:

a support member having a pair of opposed side walls extending rearward;

a boss connected to each side wall;

a pedal shaft supported by the boss, the pedal shaft having a distal end spaced from the support member in a vehicle width direction toward a vehicle center;

a stay affixed to the support member spaced from the boss and extending toward the vehicle center;

a clutch pedal lever of a turn-over mechanism for the clutch pedal mounted on the distal end of the pedal shaft for operating a clutch master cylinder;

a spring and a return spring arm of the turn-over mechanism disposed between the clutch pedal lever and the support member, the spring being connected between the stay and one end of the return spring arm; and a protective member connected between the stay and the boss for preventing interference between the turn-over mechanism and a wiring harness running above the support member in said vehicle width direction;

wherein the support member, stay, boss, and protective member form a square.

* * * * *